United States Patent [19]

Skrbina et al.

[11] Patent Number: 4,943,109
[45] Date of Patent: Jul. 24, 1990

[54] AUTOMOTIVE DOOR ASSEMBLY HAVING A PLUG-IN ELECTRIFIED INTERIOR PANEL

[75] Inventors: John R. Skrbina, Livonia, Mich.; Gregory A. Polityka, Oshawa, Canada; Mark L. Smith, Livonia, Mich.

[73] Assignees: Ford Motor Company, Newmarket, Mich.; Magna International, Inc., Ontario, Canada

[21] Appl. No.: 229,956
[22] Filed: Aug. 9, 1988
[51] Int. Cl.⁵ .................. B60J 5/00; H01R 13/642
[52] U.S. Cl. .................................... 296/146; 439/34; 439/248; 174/72 A
[58] Field of Search ............. 296/146; 439/34, 247, 439/348, 596; 174/72 A

[56] References Cited

U.S. PATENT DOCUMENTS

| | | | |
|---|---|---|---|
| 3,836,415 | 9/1974 | Hilderbrandt | 174/72 A X |
| 4,403,155 | 9/1983 | Aoki et al. | 307/10.1 |
| 4,603,930 | 8/1986 | Ito | 439/78 |
| 4,711,052 | 12/1987 | Maeda et al. | 49/502 |
| 4,755,149 | 7/1988 | de Jong et al. | 439/248 |
| 4,789,348 | 12/1988 | Hampton | 439/596 X |
| 4,800,648 | 1/1989 | Nakayama et al. | 296/146 X |
| 4,812,133 | 3/1989 | Fleak et al. | 439/248 |
| 4,815,984 | 3/1989 | Sugiyama et al. | 296/146 X |
| 4,818,236 | 4/1989 | Nakayama et al. | 439/34 |
| 4,820,180 | 4/1989 | Mosquera et al. | 439/248 |
| 4,824,387 | 4/1989 | de Jong et al. | 439/248 |
| 4,824,388 | 4/1989 | Pickel | 439/248 |

FOREIGN PATENT DOCUMENTS

| | | | |
|---|---|---|---|
| 0056915 | 4/1983 | Japan | 296/146 |
| 61-9111 | 1/1986 | Japan | |
| 0030422 | 2/1986 | Japan | 296/146 |
| 0712880 | 1/1980 | U.S.S.R. | 439/248 |
| 2025160 | 1/1980 | United Kingdom | 439/248 |
| 2164609 | 3/1986 | United Kingdom | 439/34 |

Primary Examiner—Dennis H. Pedder
Attorney, Agent, or Firm—Cushman, Darby & Cushman

[57] ABSTRACT

An automotive door assembly comprising a rigid frame structure defining the main body of the door assembly, an outer skin fixed to an outer side of the rigid frame structure defining the exterior appearance of the door assembly, and a panel assembly disposed on the opposite side of the rigid frame structure defining the interior appearance of the door assembly. A plurality of electrically operated components are carried by the rigid frame structure having first current connectors mounted in generally stationary relation on the rigid frame structure in oppositely facing and oppositely accessible relation with respect to the outer skin. An electrical harness assembly forming a part of the panel assembly includes second current connectors mounted in generally stationary relation on the panel assembly in oppositely facing and oppositely accessible relation with respect to the appearance defining surface thereof. The first and second current connectors include male and female elements adapted to be interengaged in response to the movement of the panel assembly into its operative position. Certain of the male and female elements are mounted to accommodate limited relative movement therebetween in a direction lateral to the direction of element interengagement so as to ensure that the male and female elements are interengaged during the movement of the panel means into the operative position thereof and remain thereon. Fasteners secure the panel assembly to the rigid frame structure in its operative position.

8 Claims, 8 Drawing Sheets

AUTOMOTIVE DOOR ASSEMBLY HAVING A PLUG-IN ELECTRIFIED INTERIOR PANEL

This invention relates to automotive doors and more particularly to improvements in automotive doors having electrical components therein.

Automotive doors of the type herein contemplated constitute an assembly including a rigid frame structure defining the main body of the door assembly adapted to be mounted with respect to an automotive vehicle for movement between an open position and a closed position. Fixed to the outer side of the rigid frame structure is an outer skin structure which defines the exterior appearance of the door assembly. Fixed to the opposite side of the rigid frame structure is a panel structure which defines the interior appearance of the door assembly. The door assembly is provided with a mechanical door latch having a locking mechanism for locking the door in its latched closed position and an actuating mechanism for releasing the latch to enable the door assembly to be moved from its closed position into its open position.

The rigid frame structure in most instances of the door assembly is configured to provide a through opening within which is mounted one or more than one window. In most instances, the window is provided with an operating mechanism by which the window is moved between a closed position within the opening and an open position out of closing relation with the opening. In many instances where a window is provided, there is also a side view mirror assembly provided on the exterior side of the door assembly in a position to be viewed from the vehicle interior through the window and/or door opening.

In addition to the above mechanical components, it has been the practice heretofore to optionally include various electrically operated components. These include one or more speakers for the sound system of the vehicle, a door ajar switch, lights, an electric motor to provide for power operation of the window or windows between open and closed positions, electric motors for positioning the side view mirror, and an electric device for locking and unlocking the latch. In many instances, the door assembly is provided in a separate relatively small interior control panel containing switches or the like for controlling the various electrical components.

Typically, because the electrical components were generally regarded to be optional, they were not built into the door frame structure at the time the door frame structure itself was manufactured, but, rather, the electrical components were installed after the door assembly itself had been hinged to the vehicle body. Typically, the outer skin was included as a manufactured part of the door frame structure so that the door frame structure itself was formed with appropriate openings enabling the electrical components to be fixed in operative relation to the rigid frame structure on the opposite side of the rigid frame structure form the outer skin. Each electrical component included electrical wires which extended from the component and terminated in an electrical connector. The installation procedure, in addition to the mechanical attachment of each electrical component to the rigid frame structure, also included an electrical connection of the associated electrical connector with an electrical connector of a wire harness assembly and the positioning of the wire harness assembly in the space between the rigid frame structure and outer skin.

The wire harness assembly served the function of electrically connecting the various electrical components installed and the various controls provided in the door assembly with the main electrical system of the vehicle. In some instances extra controls were provided in the door control panel for operating electrical components remote from the door assembly. For example, a door at the driver's side, frequently included controls for opening and closing all of the outer windows of the vehicle. To accomplish its function, the wire harness assembly included an inlet end section terminating with a large electrical connector or several smaller connectors capable of mating with a cooperating connector or set of connectors of the main electrical system. The inlet end portion of the wire harness assembly extended through a suitable opening in the rigid frame structure into the space between the outer skin and the rigid frame structure where electrical connection with the electrical components if required was made. After installation of the electrical components and wire harness assembly had been completed, there were extended through openings in the rigid frame structure wires carrying one or a series of electrical connections for making connection with a corresponding electrical connector or series of electrical connectors on wires coming from the electrical control panel. In many instances the electrical control panel was preassembled with the interior cover panel. Consequently, before the cover panel preassembly could be fixed in position on the rigid frame structure it was necessary for the installer to reach around the panel and accomplish the connection of the various electrical connectors provided. The need to install the wire harness assembly and effect whatever connections were necessary to the installed electrical components and to effect the final electrical connections between the wire harness, components and controls while reaching around the panel assembly rendered the installation difficult and time consuming. Since installation took place on the main assembly line, the time factor resulted in the necessity to provide plural installers and the difficulty factor presented a quality control problem. An incompletely or defectively mated pair of electrical connectors on the assembly line meant later disassembly to achieve proper mating.

It has been proposed in published Japanese patent application Sho-61-9111, dated Jan. 16, 1986, to move the wire harness assembly from the rigid frame structure onto the interior panel. This proposal alleviates some of the time problems in that the harness is handled with the trim panel, however, the difficulty factor leading to quality control problems is not addressed. What is needed is an improvement which deals with both the time factor and the difficulty factor together.

It is an object of the present invention to provide an improved automotive vehicle door assembly of the type described having components which can be assembled in a manner to substantially alleviate if not eliminate both the time and difficulty factors described above. In accordance with the principles of the present invention, this objective is obtained by providing a door assembly in which the electrically operated components are installed on the rigid frame structure with first current connectors associated therewith mounted in generally stationary relation on the rigid frame structure of the door assembly in oppositely facing and oppositely accessible relation with respect to the outer skin of the door assembly. The interior panel which is of substantial size and presents the opaque surfaces defining the interior appearance of the door assembly has the wire harness assembly mounted on it. The wire harness assembly has second current connectors which are mounted in generally stationary relation on the panel in oppositely facing and oppositely accessible relation with respect to the opaque surfaces thereof. The first and second current connectors include male and female elements adapted to be interengaged in response to the movement of the panel into the operative position thereof. The first and second current connectors are mounted so that certain of the male and female elements of the first and second current connectors accommodate limited relative movement there between in a direction lateral to the direction element interengagement so as to ensure that the male and female elements of the first and second current connectors are interengaged during the movement of the panel into the operative position thereof. In addition, fasteners are provided for securing the panel to the rigid frame structure in the operative position. It can be seen that with this combination of components, both the time factor and the difficulty factor are substantially alleviated if not eliminated resulting in a door assembly which can be assembled in a minimum time on the line by accomplishing a subassembly of the components in a panel assembly which can be attached to the door frame structure with the optional electric components mounted thereon by simply moving the panel into operative position with the rigid frame structure of the door assembly so that during this movement, all of the electrical connections are made in a complete and accurate fashion.

Another object of the present invention is the provision of a door assembly and a panel assembly utilized therein which is simple in construction, economical to manufacture and effective in operation.

These and other objects of the present invention will become more apparent during the course of the following detailed description and appended claims.

The invention may best be understood with reference to the accompanying drawings wherein an illustrative embodiment is shown.

In the drawings.

Figure 1A:
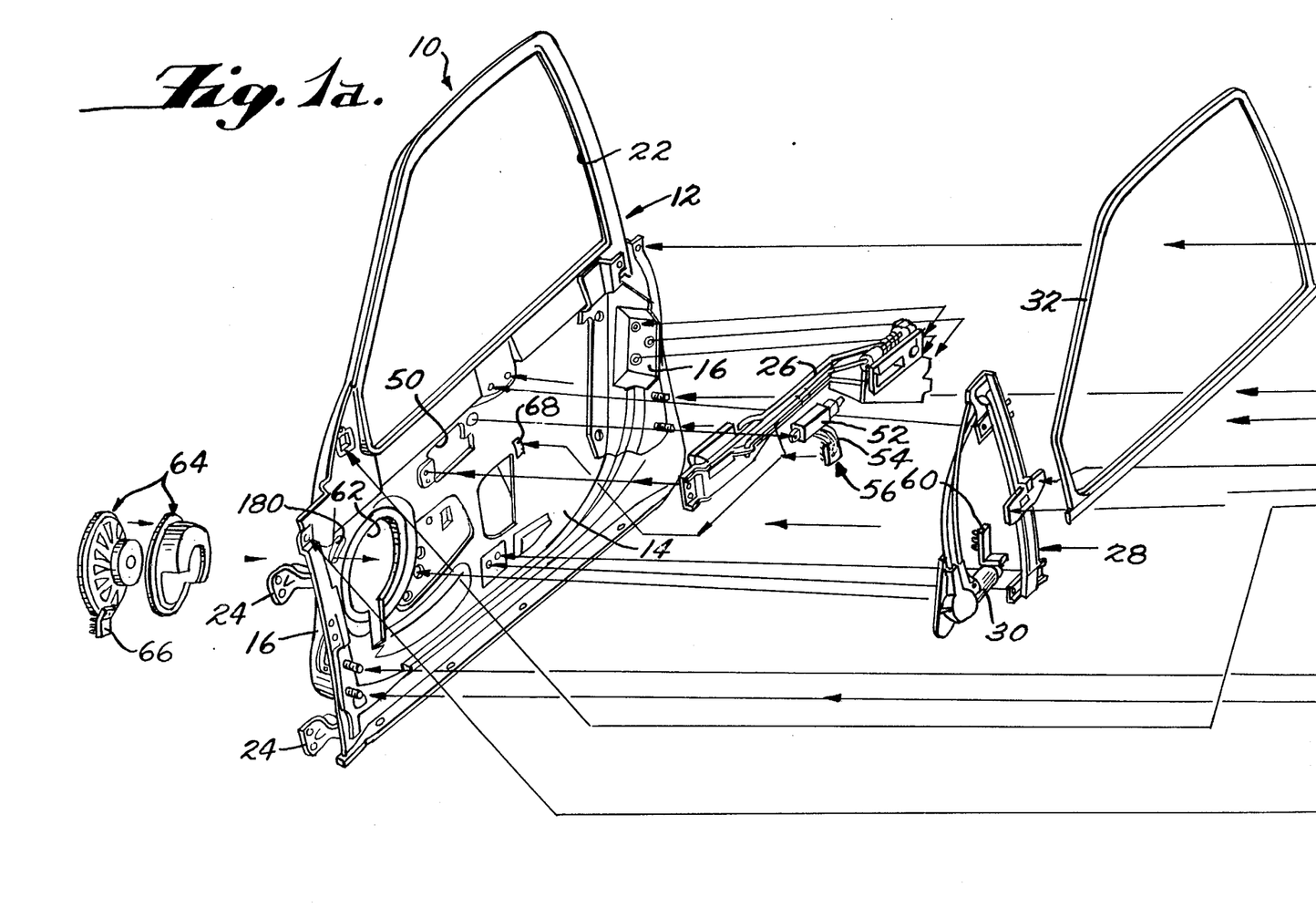
FIG. 1a and 1b are exploded exterior perspective views illustrated on two cooperating sheets of a door assembly embodying the principles of the present invention showing the major components thereof except for the interior panel assembly.
Figure 1B:
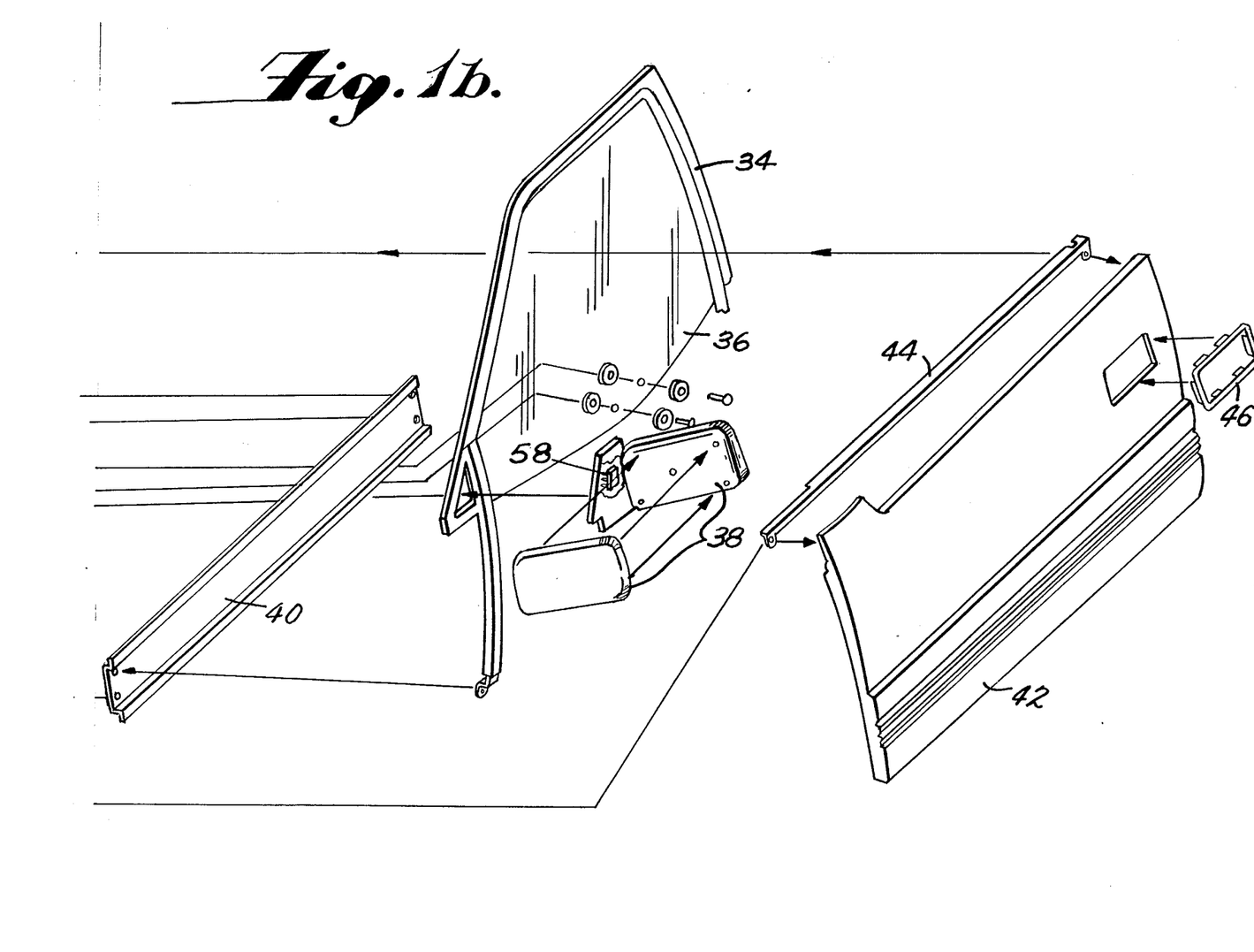
Figure 2:
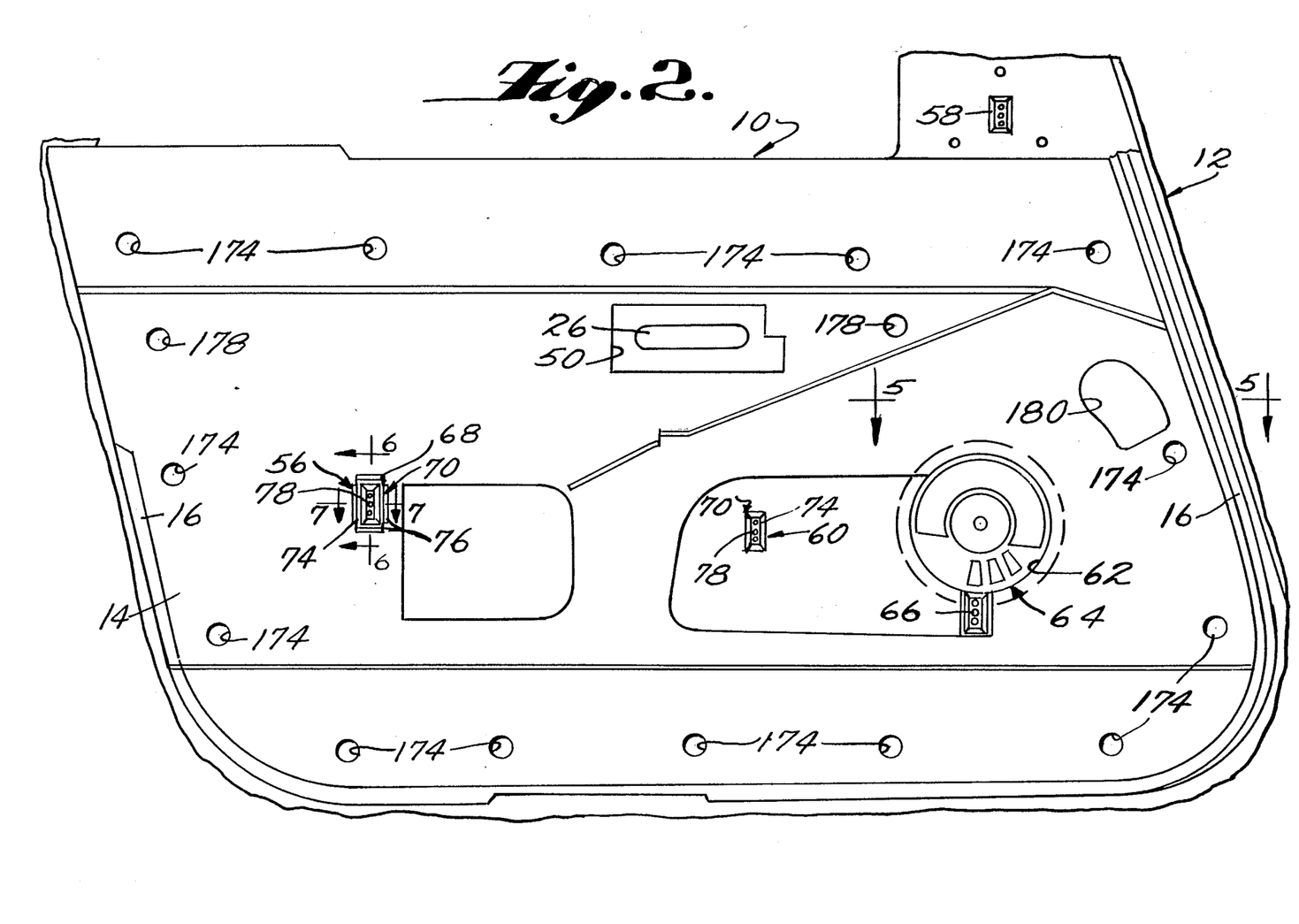
FIG. 2 is a fragmentary elevational view of the side of the rigid frame structure of the door assembly facing toward the interior when the door assembly is closed.
Figure 3:
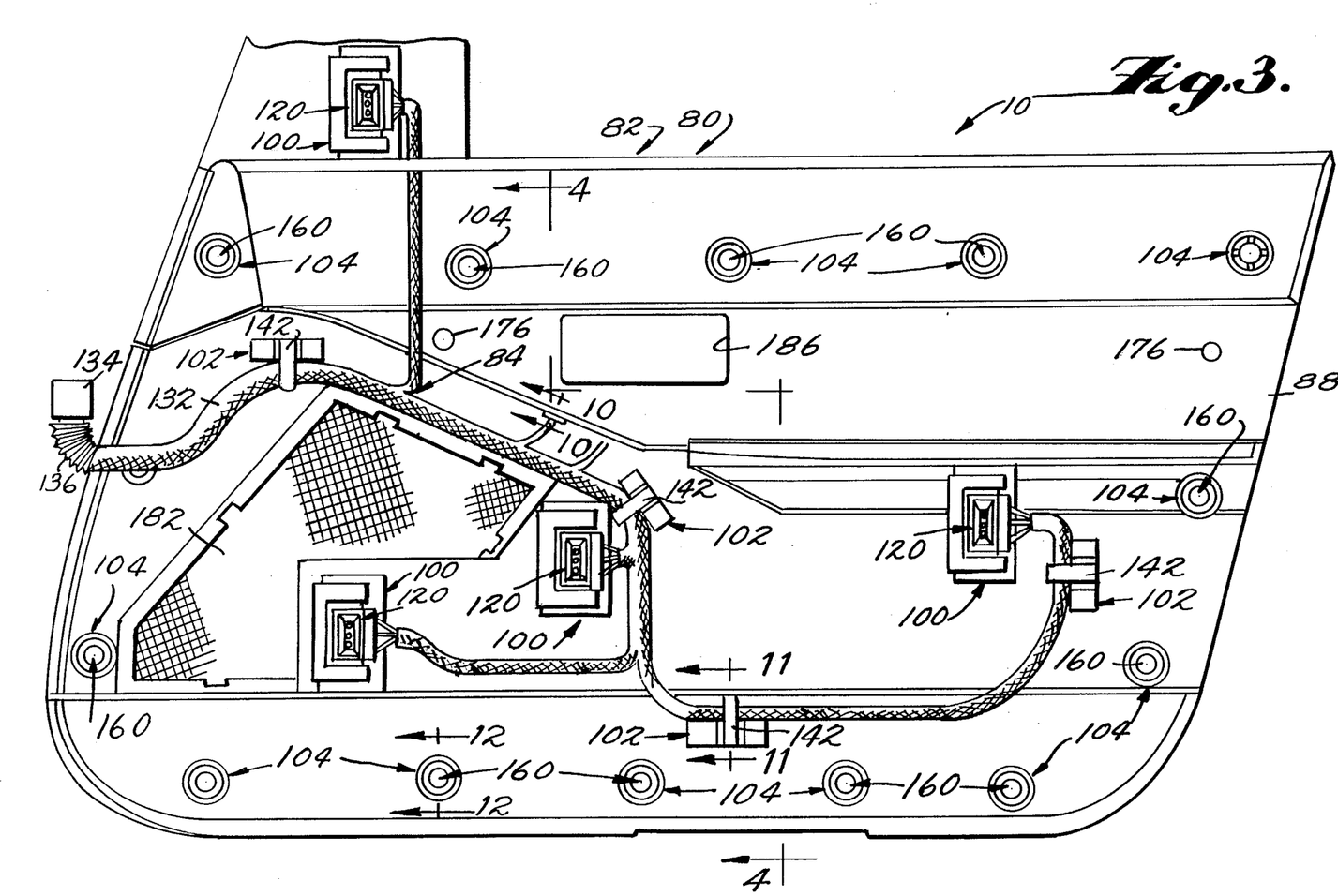
FIG. 3 is an elevational view of the side of the interior panel assembly facing away from the interior when the door assembly is closed.
Figure 4:
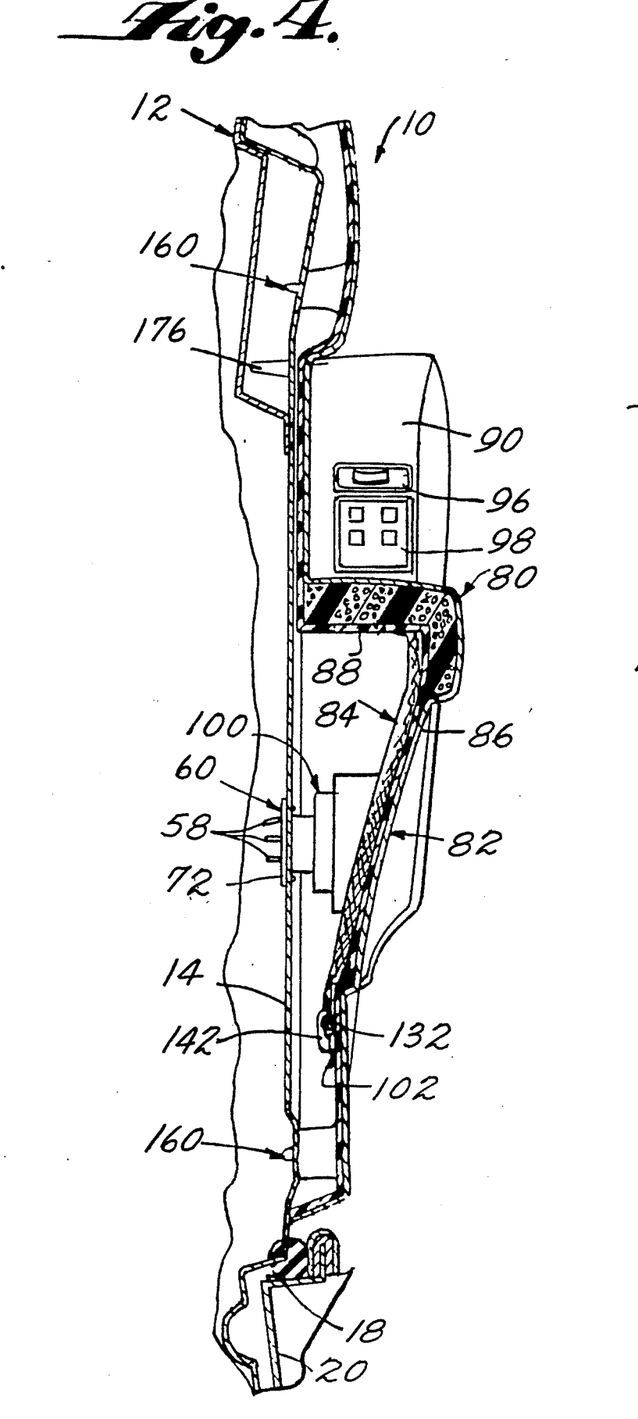
FIG. 4 is a fragmentary sectional view taken along the line 4—4 of FIG. 3 showing the panel assembly of FIG. 3 in cooperatively mounted on the structure of FIG. 2 and a contiguous part of the automotive vehicle defining the opening which the door assembly closes off.

Referring now more particularly to the drawings, there is shown in FIGS. 1-3 an automotive vehicle door assembly, generally indicated at 10, embodying the principles of the present invention. As best shown in FIG. 1, the door assembly 10 includes a main rigid frame structure, generally indicated at 12, which is of a generally conventional construction made up of sheet metal stampings welded together. As shown, the rigid frame structure includes a side wall portion of sheet metal which is indicated at 14 and a peripheral edge wall portion 16 which is configured to engage within an opening 18 in the automotive vehicle 20 which is controlled by the door assembly 10 (see FIGS. 3 and 4). It will be noted that the upper portion of the rigid frame structure 12 provides a window opening 22 so that the remaining lower portion is of a generally dished configuration with the side wall portion 14 representing the bottom of the dish and the opposite side constituting the open or top of the dish. As is shown in FIG. 1, brackets 24 are fixed to the peripheral wall portion at one end. The brackets 24 cooperate with hinges (not shown) which are of conventional configuration and connected with the vehicle body. In accordance with usual practice, the hinges mount the door assembly 10 for swinging movement between open and closed portions with respect to the door opening 18 of the vehicle 20.

Mounted on the rigid frame structure 12 at the opposite end is a latch mechanism or assembly 26 which is suitably fixed in the position indicated in FIG. 1 by the arrows associated therewith. The latch assembly 26 is of any known construction and cooperates with a latch plate (not shown) in the door opening 18 to latch the door assembly 10 in its closed position. The latch assembly 26, as shown, includes exterior and interior handles.

Fixed to the central portion of the rigid frame structure 12 on the outer side of the side wall portion 14 is a window moving mechanism, generally indicated at 28. Here, again, this mechanism is fixed to the rigid frame structure of the door in the position indicated by the arrows in FIG. 1. The window moving mechanism 28 is also of any known construction and it may be of the mechanical type, however, as shown it includes a reversible electric motor 30. As such, the mechanism 28 and motor 30 constitute an electrical component which can be installed during the assembly of the door assembly 10 on the assembly line. A window trim strip 32 is mounted within the upper portion of the rigid frame structure 12 defining the window opening 22 and a cooperating rigid window trim strip assembly 34 is mounted in spaced relation to the trim strip 32 for receiving a window 36 therebetween. The trim strip 32 and trim strip 34 assembly are fixed to the rigid frame structure 12 in the position indicated by the arrows shown in FIG. 1. The window 36 is connected to the window moving mechanism 28 in the usual manner in the position indicated by the arrows in FIG. 1.

In the embodiment shown in FIG. 1, an electrically actuated side view mirror assembly 38 is mounted on the exterior of the rigid frame structure 12 at the forward end thereof in the position indicated by the arrows in FIG. 1. It will also be noted that a strengthening bar 40 is connected between the forward and rearward ends of the rigid frame structure 12 so as to extend across the open outer or exterior side thereof. The strengthening bar 40 is fixed to the rigid frame structure by suitable fasteners in the position indicated by the arrows in FIG. 1. Finally, an outer skin 42 is provided which is fixed to the exterior side of the rigid frame structure along its front, rear and bottom edges and along its upper edge with respect to a trim strip 44. An insert 46 is provided for enabling the exterior handle of the latch mechanism 26 to extend through an opening 48 in the exterior skin 44 in a finish fashion. Similarly, the interior handle of the latch mechanism 26 is capable of extending through an opening 50 in the side wall portion 14 of the rigid frame structure 10.

In addition to the above, it will be noted, as an optional component, the latch mechanism 26 includes an electrically actuated lock actuator 52 which includes an electrical device, such as a solenoid for moving the latch mechanism 26 from its locked condition into its unlatching condition. As best shown in FIG. 1, it will be noted that the electrical lock actuator 52 includes electrical wires 54 extending therefrom which terminate in an electrical connector, generally indicated at 56.

In the illustrative embodiment shown, the lock actuator 52 is of the type which is pivotally mounted with respect to the latch mechanism to pivot into two different positions in operation corresponding to the locked and unlocked conditions of the latch mechanism 26. Consequently, electrical connector 56 is mechanically separated from the movable lock actuator 52 which it electrically actuates in order to enable the electrical connector 56 to be mounted on the rigid frame structure 12 in accordance with the principles of the present invention in the manner hereinafter to be more fully described. The wires 54 accommodate the mechanical separation while accomplishing the electrical connection. In contrast, the side view mirror assembly 38 which has its main housing mounted in fixed relation to the rigid frame structure 12 includes an electrical connector 58 which (1) provides the electrical connection for the operation of the electrical motors in the housing which adjust the mirror, and (2) is fixed directly on the side view mirror assembly centrally of the bolt holes which receive the mounting bolts. Similarly, since the reversible electric motor 30 of the window moving mechanism 28 is mounted on the rigid frame structure 12 is fixed relation, the motor 30 has an electrical connector 60 providing for both (1) the electrical connection thereof and (2) a fixed mechanical connection therewith. It will be understood that it is preferred to mount the electrical connector directly on the electrical component where the nature of the component and its mounting to the rigid frame structure allows, since the positioning of the electrical connector in its predetermined location is automatically effected without the need to effect a separate mounting, as is exemplified by the electrical connector 56.

It will be understood that other electrical components can be optionally included in the door assembly 10. For example, a circular opening 62 is formed in the side wall portion 14 adjacent the forward end thereof within which is mounted a loudspeaker assembly 64 for electrical hookup with the sound system of the vehicle. The loudspeaker 64, like the electrically actuated side view mirror 38, is a popular electrical component for inclusion in front doors. As shown, the loudspeaker 64, like the mirror, includes a fixed electrical connector 66. It will also be understood that other electrical components can be mounted on the rigid frame structure 12, such as, for example, a door ajar switch, lights or the like.

In the embodiment shown, the electrical components are adapted to be connected with the rigid frame structure 12 on the assembly line with the outer skin 42 removed. This enables the components to be rigidly attached by suitable fasteners such as rivets in a simple fashion at a time when access to both sides is available. Where the electrical components are provided with fixed electrical connectors, the said frame structure 12 is formed with appropriate openings within which the connectors are received so that they are exposed toward the interior of the rigid frame structure. Where the electrical components are provided with mechanically separated electrical connectors, such as the electrical connector 56 of the lock actuator 52, the installation includes securing the connector 56 to the side wall portion 14 of the rigid frame structure 12.

Figure 6:
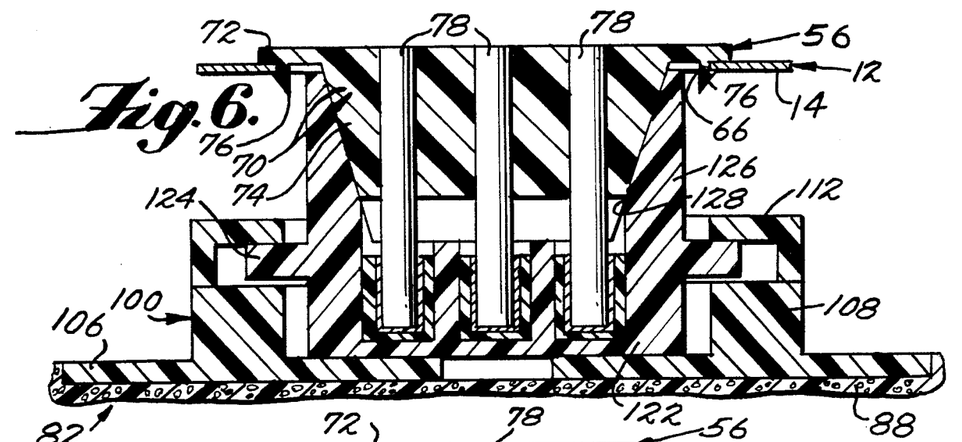
FIG. 6 is an enlarged fragmentary sectional view taken along the line 6—6 of FIG. 2 showing the structure of FIG. 2 with the panel assembly of FIG. 3 cooperatively mounted thereon.
Figure 7:
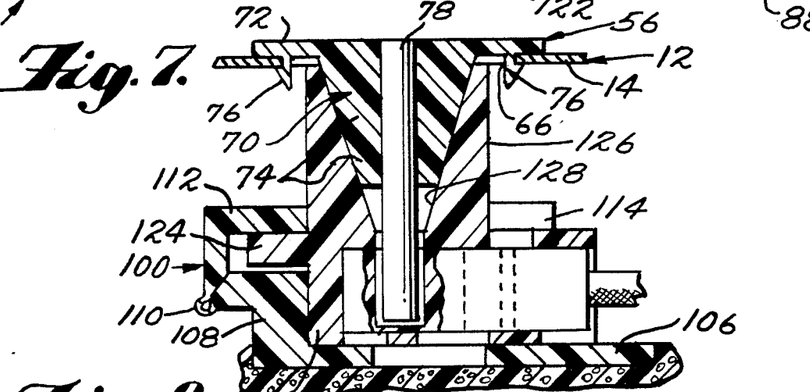
FIG. 7 is an enlarged fragmentary sectional view similar to FIG. 6.
Figure 8:
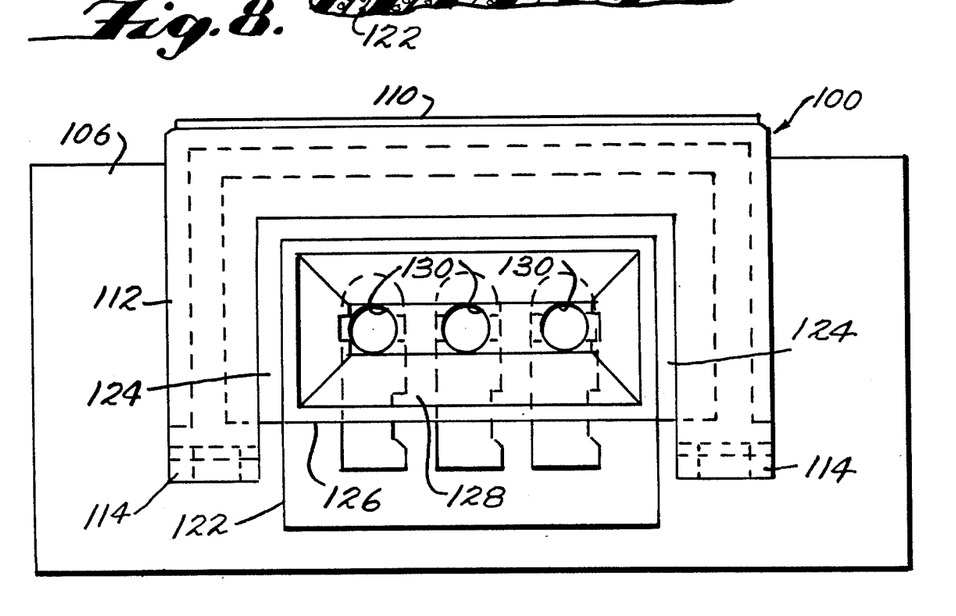
FIG. 8 is a top plan view of the assembled connector fitment and connector forming a part of the panel assembly of FIG. 3.

Any suitable mounting means may be provided to accomplish this securement and, as shown, in the arrangement wherein the mounting can take place from an open exterior side of the rigid frame structure 12, the mounting means is preferably of the type which can be secured by pushing each connector into a corresponding opening. As shown, there is included a generally rectangular opening 68 formed in the side wall portion 14 to receive the connector 56. As best shown in FIGS. 6 and 7, the connector 56 is formed of a molded body 70 of plastic material (e.g. polypropylene) which includes a plate-like base portion 72 of a size greater than the associated opening 66 or 68. Extending from the central section of the plate-like base portion 72 is a block portion 74 of frusto-pyramidal shape. Extending from the base portion 72 in outwardly spaced relation to the four sides of the block portion 74 is a series of four separate securing portions 76 of barbed shaped cross section operable to engage and clip over the four side edges of the sheet metal defining the associated rectangular opening 66 or 68. The plastic body 70 has a series of three parallel openings extending through the base portion 72 and block portion 74 within which are mounted three electrical plugs 78. Each plug 78 includes one end portion which extends outwardly of the block portion 74 of the body 70 and an opposite end adapted to have a wire connected thereto. It will be understood that electrical connectors 58, 60, and 64 are constructed similarly to the electrical connector 56, except that the securing portions 76 are eliminated.

It will be also understood that the present invention contemplates the more conventionally constructed door assembly in which the outer skin 42 is initially fixed to the rigid frame structure 12 and the electrical components are mounted from the interior side of the side wall portion 14 of the rigid frame structure 12 in which case the side wall portion 14 is formed with appropriately large openings (not shown) to permit assembly from the side onto the opposite side of the side wall portion 14. Under these circumstances, the manner of securing the separate connector 56 to the side wall portion 14 of the rigid frame structure 12 could accommodate a more lateral movement into secured relationship with the sheet metal.

Referring now more particularly to FIG. 3, the door assembly 10 also includes a panel assembly, generally indicated at 80, which is constructed in accordance with the principles of the present invention. As shown, the panel assembly 80 basically includes a panel structure, generally indicated at 82, and a wire harness assembly, generally indicated at 84. The panel structure 82 may be of any known construction. However, preferably it is a molded laminate structure including a first layer 86 which may be of any suitable material or a composite of different materials. The materials of the first layer 86 (see FIG. 4) provide the opaque surface means presented on the interior of the door assembly 10 which gives the door assembly its interior appearance in a position below the window opening 22. The first layer 86 may include farbrics of both artificial and natural fibers. It may include plastic sheets of simulated leather or other designs. The panel structure 82 also includes a second layer 88 which is of a rigid material, as for example, a foamed glass filled polyurethane plastic.

The panel structure 82 may be configured so as to provide lights, although such lights are not illustrated in the embodiments shown. The panel structure 82 is molded to include an arm rest section 90 in the central portion thereof which has a pair of cutouts 92 (see FIG. 10) on the forward portion thereof within which separate control panels 96 and 98 are mounted to provide for the control of the electrical lock actuator 52 and the electrical window moving motor 30, respectively. It will be understood that other control panels and controls may be provided, depending upon the number of components requiring controls which are embodied in the door assembly and the number of controls which are to be mounted in the door assembly for controlling other electrical components remote from the door assembly.

As best shown in FIG. 3, the panel structure 82 is molded with a plurality of connector fitments, generally indicated at 100, embedded in the second layer thereof, a plurality of harness fitments, generally indicated at 102, embedded in the second layer thereof and a plurality fastener fitments, generally indicated at 104, embedded in the second layer thereof. As shown, the connector fitments 100 are embedded in the second layer 88 of foam plastic material in positions corresponding to the positions of the openings 66 and 68 in the sidewall portion 14 into which the connector 56 is grippingly engaged.

Figure 9:
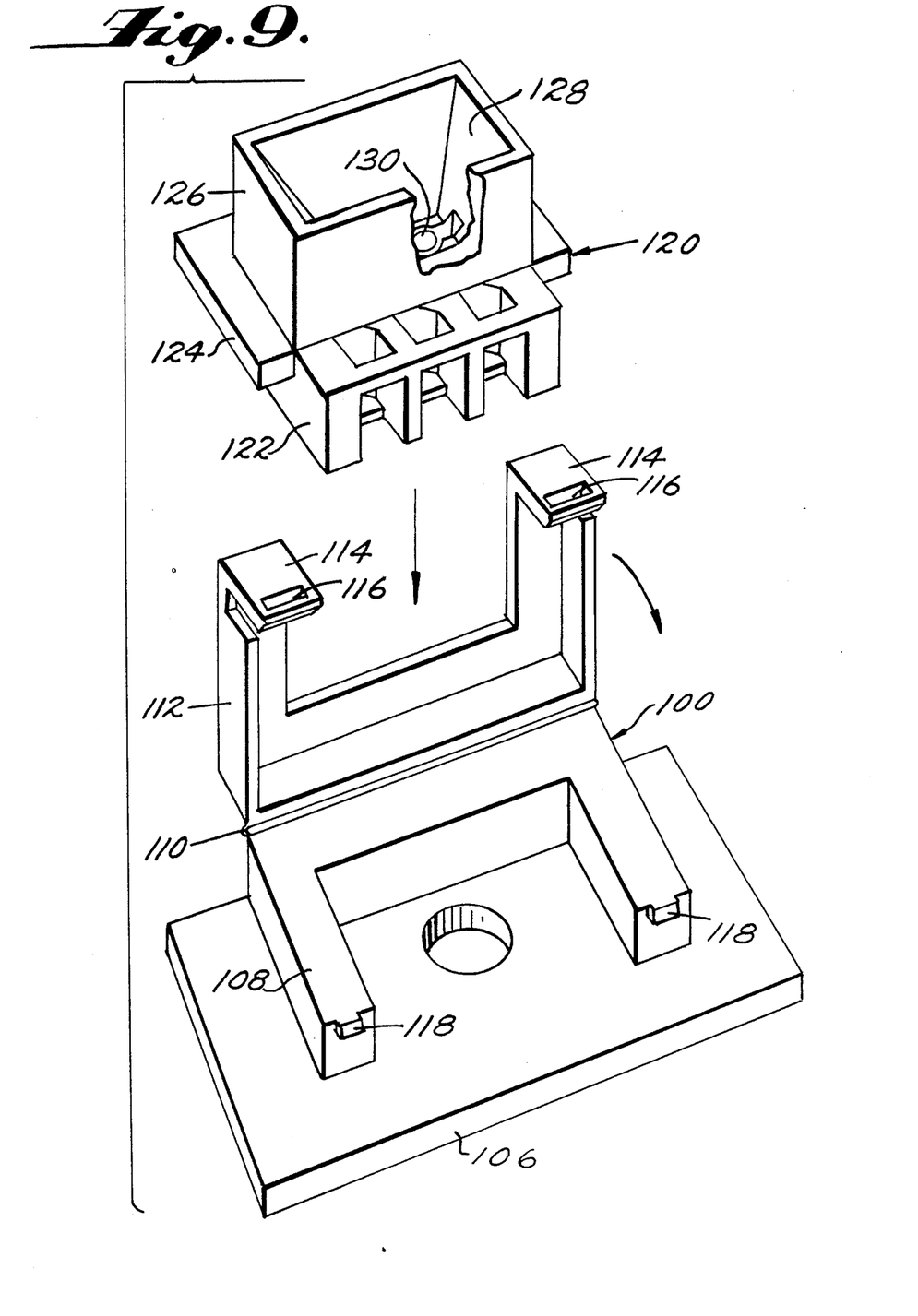
FIG. 9 is an exploded perspective view of the connector fitment and connector of FIG. 8 corresponding with a preassembled portion thereof.

As best shown in FIGS. 6–9, each connector fitment 100 is of substantially identical construction and each is preferably formed as a single molded plastic body. As best shown in FIG. 9, the plastic body of each connector fitment 100 includes a base plate portion 106 which is of rectangular configuration with a central opening therethrough arranged to be molded in embedded relation within the second layer 88 of the panel structure 82. Extending from the base plate portion 106 is a U-shaped mounting section 108. Formed along the upper rearward edge of the bight portion of the U-shaped mounting section 108 is a living hinge section 110 which is also attached to a U-shaped enclosure section 112. The legs and bight portion of the U-shaped enclosure section 112 is of L-shaped configuration in cross section. Extending from the free ends of the legs of the enclosure section 112 are L-shaped latching elements 114 having lug receiving holes 116 extending therethrough. Latching lugs 118 are formed on the upper free ends of the legs of the U-shaped mounting section 108.

Each fitment 100 is adapted to receive a connector, generally indicated at 120. Each connector 120 is preferably formed as a molded body of plastic material which includes a rectangular base portion 122 adapted to be disposed within the U-shaped mounting section 108 of the fitment 100. A U-shaped flange portion 124 extends from the upper portion of the base portion 122 along one side edge thereof and partially along two end edges thereof. The connector body also includes a connector portion 126 extending from the base portion 122 and the flange portion 124. As best shown in FIGS. 6, 7 and 9, the connector portion 126 is of generally rectangular prismatic exterior configuration with an interior socket having surfaces 128 of frusto pyramidal shape leading to the interior of the base portion 122. As shown, the base portion 122 is formed with three openings extending therein within which are mounted electrical socket assemblies 130 which are presented in an axially opening position with respect to the bottom of the interior frusto pyramidal shaped surfaces 128.

The frusto pyramidal shaped surfaces 128 are adapted to mate with the frusto pyramidal block portions 74 of the connectors 56 and 60. The plugs or prongs 78 of the connectors 56 and 60 constitute male electrical elements of the connectors 56 and 60 and are adapted to engage within the socket assemblies 130 of the associated connectors 120 which constitute female elements thereof.

The manner in which the connectors 120 are mounted within the connector fitments 100 is an important feature of the present invention. As best shown in FIG. 9, each connector 120 is arranged to be mounted with its base portion 122 within the U-shaped mounting section 108 of the connector fitment 100 with the latter retained in an open position such as shown in FIG. 9. The base portion 122 of the connector 120 has an exterior peripheral size less than the interior peripheral size of the U-shaped mounting section 108. The U-shaped mounting flange 124 of the connector 120 extends over the U-shaped mounting section 108. With the connector 120 in this operative position, the enclosure section 112 of the connector fitment 100 is then pivoted, by virtue of the living hinge section 110, in a direction to superimpose the enclosure section 112 over the mounting section 108. During the latter part of this movement the latching elements 114 ride over the lugs 118 until the lugs enter the openings 116. Once the lugs 118 are engaged within the openings 116, the enclosure section 112 is fixed to the mounting section. In this operative position, the enclosure section 112 provides a surface facing in the direction of the first layer 86 of the panel structure 82 which engages an oppositely facing surface of the flange portion 124 of the connector. Likewise, the base portion 112 of the connector provides a surface facing toward the first layer 86 of the panel structure 82 which engages or is slightly spaced with respect to an opposite facing surface provided by the base portion 106 of the connector fitment 100. In this way, the connector fitment 100 serves to mount the connector 120 generally against movement in a direction toward and away from the first layer 86 of the panel structure 82. However, it will be noted that the exterior peripheral size of the U-shaped flange portion 124 of the connector 120 is of lesser size than the interior peripheral size of the latching elements 114 and corresponding legs of the U-shaped enclosure section 112 of the connector fitment 100. The relationship of these various surfaces serve to mount the connector 120 in the connector fitment 100 for movement in a transverse direction with respect to the direction in which the movement is substantially prevented. Moreover, the larger interior peripheral surfaces of the connector fitment constitute stop surfaces for engaging the smaller peripheral surfaces of the connector to limit the extent to which this transverse movement can take place. This limited transverse movement ensures a mating relationship between the female electrical terminals 130 of the connector 120 and the male electrical elements 76 of the connector 56 or 60 adapted to cooperate therewith when the panel assembly 80 is moved into operative position with the rigid frame structure 12 in a manner hereinafter to be more fully described.

Figures 5, 10, 12:
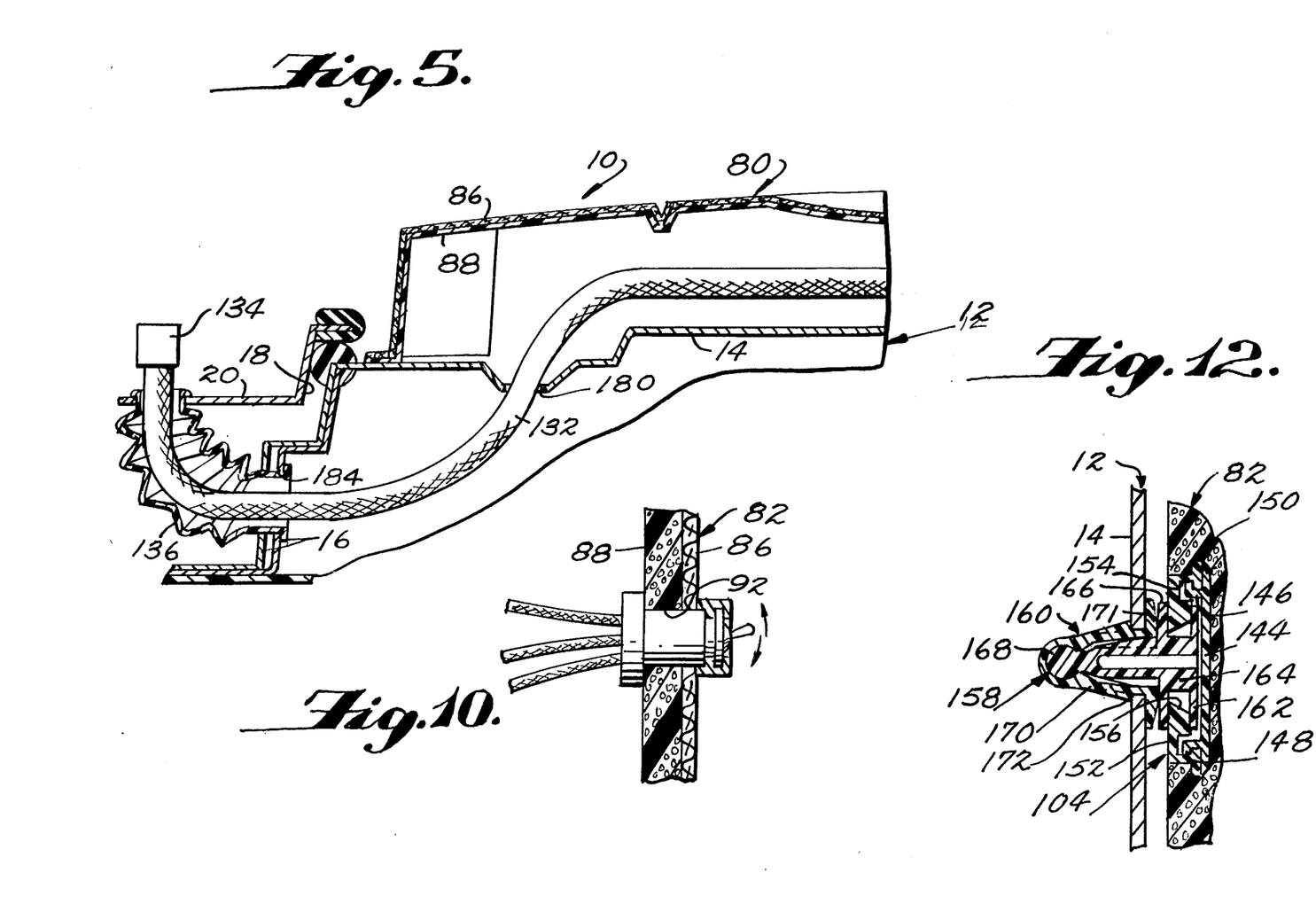
FIG. 5 is a view similar to FIG. 4 taken along the line 5—5 of FIG. 2.
FIG. 10 is an enlarged fragmentary sectional view taken along the line 10—10 of FIG. 3.
FIG. 12 is an enlarged fragmentary sectional view similar to FIG. 10 taken along the line 12—12 of FIG. 3.

It will be understood that the socket assemblies 130 of the connectors 120 are adapted to be integrated or connected with the wire harness assembly 84. The wire harness assembly 84 comprises a number of electric wires 132 suitably bound together in accordance with usual practice. As best shown in FIGS. 3 and 5, at one end of the electric wires 132 there is provided an electric connector 134 or series of electrical connectors which enable the electric wires 132 to be suitably electrically interconnected with the main electrical system of the vehicle. As schematically indicated in the drawings, the wires are grouped together in a bundle with the connector or connectors 134 constituting the inlet end of the bundle of wires. At a position adjacent the inlet end, there is provided a rubber boot 136. The rubber boot 136 as shown is preferably of accordion configuration and capable of providing for protection of the wires 132 between the interior of the door assembly 10 and the vehicle body, both when the door assembly 10 is in its closed position as well as in its open position. The opposite end of the wires 132 are electrically connected with one or more of the connectors 120 and with one or more of the control panels 96 and 98 the existence of which is dependent upon the particular electrical components which are to be optionally embodied in the door assembly 10. For example, in the embodiment shown, the control panel 96 is provided for the electrical component constituting the electrical door lock actuator 52 and the control panel assembly 98 is provided for the window moving electric motors of the window electrical component constituting the electrical motor 30 of the window moving mechanism 28.

The control panels 96 and 98 are mounted in accordance with known principles. A convenient mounting is from the first layer side using suitable escutcheons. Where styling requires, the mounting may be from the second layer side of the panel structure 82 into the pair of openings 92 formed in the panel structure 82. An illustrative mounting is somewhat schematically illustrated in FIG. 10 as including a marginal insert plate 138 extending along the marginal edge of the exterior of the associated opening and connected with the associated control panel after the control panel is moved into the opening. The marginal insert plate 138 can include integral push fasteners such as schematically shown in FIG. 10 in order to effect the securement or separate fasteners such as screws, bolts, or the like may be utilized.

Figure 11:
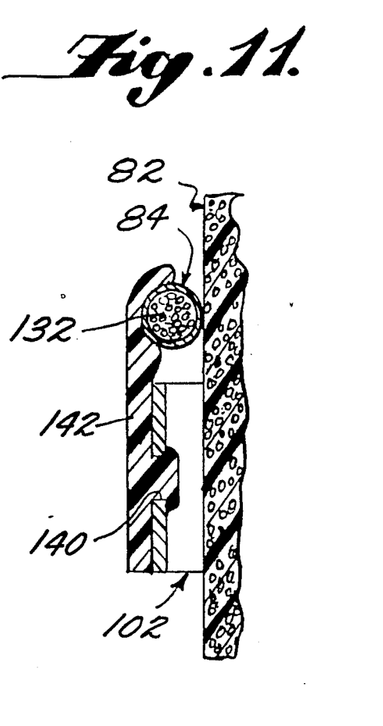
FIG. 11 is an enlarged fragmentary sectional view similar to FIG. 10 taken along the line 11—11 of FIG. 3.

As best shown in FIG. 3, the full harness assembly illustrated includes wires 132 connected to the socket assemblies 130 of the connectors 120 described. The harness fitments 102 are embedded in the second layer 88 of the panel structure 82 along the position on the second layer 88 where the wires 132 constituting the wire harness assembly 84 are to be fixedly secured. As best shown in FIGS. 3 and 11, each harness fitment may be in the form of a flange U-shaped bracket having a hole 140 in the bight portion thereof. Each opening 140 is adapted to receive a push fastener 142 of the type which is fixedly engageable in the opening 140 and includes an arm portion extending over the associated bundle of wires 132 so as to effect a rigid securement of the bundle to the second layer 88 of the panel structure 82.

As best shown in FIG. 3, all the fastener fitments 104 are also of substantially identical configuration and preferably are molded in embedded relation within the second layer 88 of the panel structure 82 at positions spaced along marginal periphery thereof. As best shown in FIG. 12, each fastener fitment 104 is preferably formed as a one piece molded body to include a circular base portion 144 having an upstanding circular wall portion 146 formed with a beadlike flange 148 at its exterior free edge. A living hinge section 150 is formed integrally with the periphery of the circular base portion 144 and a circular wall portion 152. As shown, the circular wall portion is L-shaped in cross section and the interior of one leg of the L-shaped configuration is formed with an annular groove 154 for receiving the bead-like flange 148. When the circular mounting portion 152 is moved with respect to the base portion 144, through flexure of the hinge 150, the flange 148 pops into the groove 154 to retain the circular wall portion 152 so that a surface thereof surrounding a central opening 156 therethrough faces in a direction toward the opaque surface or first layer 86 of the panel structure 82. This operative position of each fastener fitment 104 is shown in FIG. 12.

While each fastener fitment 104 may receive a conventional Christmas tree fastener, it is preferable that the fastener be of the two-piece type. FIG. 12 illustrates a two-piece fastener which includes a fastener piece, generally indicated at 158, of molded plastic material and a socket piece, generally indicated at 160, of molded plastic material. The fastener piece 158 is molded to include a circular base portion 162 of a size greater than the central opening 156 in the circular mounting portion 152 but of a size less than the interior dimension of the wall portion 146 so as to present a surface which slidably engages the surface of the circular mounting portion facing in a direction toward the first layer 86 of the panel structure 82. The base portion 162 has a central stem portion 164 extending from the central section thereof of a size smaller than the size of the opening 156 so as to extend therethrough in a manner enabling the base portion 162 to have a limited amount of movement laterally with respect to the fitment 104. The fastener 158 is shaped to include a circular flange 166 extending from the stem portion 164 in closely spaced relation to the base portion 162 and a knob portion 168 is formed at the free end of the stem portion 164.

The socket piece 160 of the two-piece fastener assembly is molded to include a main socket portion 170 which is closed at one end and has a mounting flange 171 extending outwardly from its opposite open end. The interior surface of the closed end of the socket portion is configured to releasable receive and engage the knob portion 168 of the fastener 158. Formed on the exterior surface of the socket portion in closely spaced relation to the mounting flange 171 is a series of annularly spaced ramped lugs 172.

Referring now more particlularly to FIG. 2, it will be noted that the side wall portion 14 of the rigid frame structure 12 is formed with a series of spaced fastener receiving opening 174 which are positioned along the marginal periphery thereof in corresponding positions to the fastener fitments 104.

Finally, it will be noted that there is provided on the panel structure 82 a pair of spaced guidepins 176 extending from the second layer 88 thereof in a direction away from the opaque surface provided by the first layer 86. While the guidepins 176 may be of any construction, as shown, they are formed integrally from the rigid foam material of the second layer 88. With reference to FIG. 2, it will be noted that the side wall portion 14 of the rigid frame structure 12 is provided with a pair of registering guide opening 178 of a size to guidingly receive the guidepins 176.

It can be seen that with the present invention an option must still be exercised on the assembly line with respect to just what electrical components are to be embodied in the door assembly 10. In the embodiment shown, there are options which must be exercised with respect to four separate electrical components, although it will be understood that other additional components may be provided as, for example, a door ajar switch, door lights and the like. In each instance, while the optional installation of the component itself in the rigid frame structure 12 cannot be avoided, the electrical connection required with respect to each component is a simple push-in attachment such as connector 56 or a fixed connector 58, 60 or 66 rather than a feeding of a wire harness assembly into the exterior side of the rigid frame structure.

The installation of the wire harness assembly 84 with the particular panel structure 82 from a standpoint of the color of the opaque surface provided by the first layer thereof and the desired option as to control panels 96 and 98 can be accomplished away from the main assembly line so that the only time required at the assembly line is for the final installation of the panel assembly 80 to the rigid frame structure 12 after the electrical components have been mounted thereon. In the arrangement shown, it is contemplated that the panel assembly 80 would be assembled to the rigid frame structure 12 at a time prior to the installation of the outer skin 42 so that in this instance the inlet connector 134 end portion of the harness assembly 84 which extends from the panel structure 82 can simply be inserted through an opening 180 in the side wall portion 14 of the rigid frame structure 12 prior to the movement of the panel assembly 80 into its operative position with respect to the rigid frame structure 12. As best shown in FIG. 3, an oversize grill 182 is removably fixed within an appropriate opening in the panel structure 82 so as to provide for ready access to the speaker assembly mounted on the rigid frame structure 12. Such simpler access is considered desirable since the instances for need to service speakers assemblies is considerably more than that required for the other electrical components. However, in this regard, it will be noted that the two-piece fastener assemblies provide for repeated removal of the panel assembly 80 away from its operative position and back into its operative position for servicing of the electrical components when required.

With the arrangement shown where the outer skin 42 is assembled last, the assembler of the outer skin 42 would be assigned the task of feeding the inlet connector 134 of the wire harness assembly 84 together with the boot 136 through an opening 184 (see FIG. 5) in the peripheral edge wall portion 16 of the rigid frame structure 12 of the door before installing the outer skin. It will be understood that where the outer skin 42 is initially formed as part of the rigid frame structure 12 and the electrical components are mounted thereon from the interior side, it is desirable to enlarge opening 184 and particularly opening 180 so as to enable simple feeding through both openings from the interior side. Moreover, it would be possible to provide for the inlet end of the wire harness assembly 84 to come out of panel structure 82 and go through the boot 136 directly to, for example, the dash board assembly so as to avoid the necessity to accomplish a feeding of the inlet end of the harness assembly through openings 180 and 184 in the rigid frame structure 12. Such an arrangement is clearly contemplated, particularly in those situations when the door is closed, the panel structure 82 includes a portion which is adjacent to dashboard.

It is important to note the simplicity with which the panel assembly 80 of the present invention is moved into its operative position. Initially, it should be noted that panel structure 82 includes an opening 186 to receive the interior handle of the latch mechanism 26. In the embodiment shown, after feeding the inlet end of the harness assembly 84 through the opening 180 the installer then need only align the guidepins 176 with respect to the guide openings 178 and then simply push the entire panel assembly 80 in a direction toward the rigid frame structure 12, the engagement of the guidepins 176 within the openings 178 serving to guide the panel assembly 80 into its operative position during this movement. Also, it will be noted that during this movement, the prongs 78 or male elements of the connectors 56, 58, 60, and 68 fixed to the rigid frame structure 12 will initially receive the sockets 130 or female elements of the connectors 120 which are carried by panel assembly 80 for limited transverse movement with respect to the direction of movement of the panel assembly 80 into its operative position. The configuration of the connectors 120 are such that the sockets 130 will undertake a required transverse movement sufficient to enable the prongs 78 to enter the sockets as the movement of the panel assembly 80 toward its operative position is undertaken.

Also, during this movement it will be noted that the socket pieces or elements 160 of the two-piece fastener assemblies will be engaged within the fastener openings 174 in the side wall portion 14 of the rigid frame structure 12 so that as the panel assembly 80 is moved into its operative position, the ramped lugs 172 on the socket portions 170 will ride along the edge surface of the openings 174 and snap behind the marginal edge of the sheet metal defining the openings 174 just as the flange portions 171 engage the opposite surface thereof. In this way the socket pieces 160 are fixedly retained in the rigid frame structure 12. It will be understood that the handle opening 186 is suitably finished off in conventional fashion by an appropriate insert or the like after the panel structure 80 is in its operative position.

With the arrangement of the present invention, once the handle insert has been removed and a prying movement is applied to the panel assembly 80 with the same in its operative position, the socket pieces 160 will be retained on the rigid frame structure 12 and the knob portions 168 of the fastener pieces 160 will be released from their engagement within the socket portions 170, thus enabling the fastener pieces 160 to be retained on the panel assembly 80. In this way, the panel assembly 80 can be moved back into secured relation when the procedures noted above are repeated to again move the remove panel assembly back into its operative position. Thus, removal and replacement of the panel assembly can be repeatedly accomplished for service purposes if need be. It is also important to note that not only is the movement of the panel assembly into its operative position simple but in addition by this simplistic procedure a secure and accurate electrical connection is always automatically obtained.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An automotive door assembly comprising
    a rigid frame structure defining the main body of the door assembly adapted to be mounted with respect to an automotive vehicle for movement between an open position and a closed position,
    means including outer skin means fixed to an outer side of said rigid frame structure defining the exterior appearance of the door assembly,
    means including panel means disposed on an opposite side of said rigid frame structure defining the interior appearance of the door assembly,
    said rigid frame structure including a main sheet metal stamping providing a side wall portion disposed in spaced relation to said outer skin means, said side wall portion defining the opposite side of said rigid frame structure,
    electrically operated means carried by said rigid frame structure between said exterior and interior appearance defining means,
    said electrically operated means having current conductor means terminating in first current connector means,
    means mounting said first current connector means in generally stationary relation with respect to said rigid frame structure,
    said panel means being of substantial size and adapted to be moved into a predetermined operative position with respect to the opposite side of said rigid frame structure,
    said panel means having opaque surface means so as to define the corresponding interior appearance of the door assembly,
    said panel means comprising a molded laminate including a first layer containing said opaque surface means and a second layer of a rigid foamed plastic material,
    electrical harness means carried by said panel means for transmitting electrical current sources from outside of said door assembly therethrough,
    said electrical harness means terminating in second current connector means,
    means mounting said second current connector means in generally stationary relation on said panel means,
    said first and second current connector means including one of male elements and female elements adapted to be interengaged in response to the movement of said panel means into the operative position thereof,
    said mounting means being operable with respect to at least one of the male and female elements of said first and second current connector means to accommodate limited relative movement between one of said male and female elements and said mounting means in a direction transverse to the longitudinal direction of the male of said elements so as to insure that the male and female elements of the first and second current connector means are interengaged during the movement of said panel into the operative position thereof,
    said side wall portion of said rigid frame structure including first guide means,
    said panel means having second guide means,
    said first and second guide means being operable to interengage during the movement of said panel means into the operative position thereof with respect to the opposite side of said rigid frame structure so as to guide said panel means into said operative position during such movement, and
    means for securing said panel means to said rigid frame structure in said operative position,
    said first current connector means including a first current connector comprising a first body of molded plastic material containing one of said elements,
    the mounting means for said first current connector comprising a connector opening in said side wall portion and integral surface means molded in an associated first body operable to grippingly engage the sheet metal of said side wall portion defining an associated connector opening when the associated first body is moved into an operative position within the associated first opening,
    said second current connector means including a second current connector comprising a second body of molded plastic containing the associated interengaging element,
    the mounting means for said second current connector comprising a connector fitment molded in embedded relation in the second layer of said panel means,
    said connector fitment having a first mounting surface facing in a direction away from said opaque surface means, a second mounting surface parallel with and facing toward said first mounting surface and stop surfaces extending transversely with respect to said first and second mounting surfaces,
    an associated second body being mounted within said fitment between said first and second mounting surfaces so that the movement of the associated second body with respect to said fitment is generally restricted to movement in the direction of the parallel extent of said second mounting surface and engagement of the stop surfaces of said fitment with the associated second body limits the amount of movement in the direction of parallel extent of said second mounting surface which can take place.

2. An automotive door assembly as defined in claim 1 wherein said connector fitment is formed as a single plastic molding to include a base portion embedded in said second layer having a U-shaped mounting section extending therefrom and defining said first mounting surface, a U-shaped enclosure section and defining said second mounting surface and said stop surfaces, a hinge section integrally hingedly interconnecting the mounting section and enclosure section for relative movement from a second body receiving condition into an operative position retaining said second body therebetween for the aforesaid limited transverse movement and integral latching means for retaining said mounting and enclosure sections in their operative position in response to the relative movement thereof into said operative position.

3. An automotive door assembly as defined in claim 1 wherein said securing means includes a series of fastener fitments molded in embedded relation in the second layer of said panel means in spaced relation along the marginal periphery thereof, each of said fastener fitments including an apertured wall having a mounting surface facing in a direction toward said opaque surface means and a fastener including (1) a fitment engaging portion extending through said apertured wall and engaging said mounting surface in such a way as to permit a limited amount of lateral movement of said fastener with respect to said fastener fitment and (2) a fastener portion extending away from the associated apertured wall, and means operable in response to the movement of said panel means into the operative portion thereof with respect to the opposite side of said rigid frame structure for removably fixedly attaching said fastener portion to the side wall portion of said rigid frame structure.

4. An automotive door assembly as defined in claim 3 wherein the removably fixedly attaching means associated with each fastener comprises a fastener opening in said side wall portion and a socket element having (1) exterior surface means operable to fixedly grippingly engage the sheet metal defining the associated fastener opening during the movement of said panel means into the operative position thereof with respect to the opposite side of said rigid frame structure and (2) interior surface means engaging said fastener portion in such a way as to attach the socket element with said fastener portion for (1) separation in response to a forced movement of the panel means out of its operative position and (2) reattachment in response to a replacing movement of said panel means into the operative position thereof.

5. An automotive door assembly as defined in claim 3 wherein said electrically operated means includes an electrically operated lock actuator connected with a latch mechanism mounted on said rigid frame structure for selectively locking the latch mechanism when said door assembly is in a closed position, said lock actuator including solenoid means, said current conductor means comprising electric wire means electrically connected with said solenoid means and with said first current connector and a lock actuator control panel in said panel means containing an electrical control for controlling said solenoid, said lock actuator control being electrically connected with said electric harness means.

6. An automotive door assembly as defined in claim 5 wherein said rigid frame structure includes a window opening, a window and a window moving mechanism connected to said window for moving the same into closed and open relation with respect to said window opening, said electrically operated means including electric motor means for moving said window moving mechanism, said first current connector means including a separate first current connector fixed with respect to said electric motor means and a window control panel in said panel means containing an electrical control for controlling said electric motor, said window control being electrically connected with said electric harness means.

7. An automotive door assembly as defined in claim 6 wherein said electrically operated means includes an electrically operated side view mirror assembly fixed with respect to said rigid frame assembly so as to extend laterally outwardly thereof in a position to be viewed through said window opening, said first current connector means including another separate first current connector fixed with respect to said side view mirror assembly.

8. An automotive door assembly as defined in claim 6 wherein said electrically operated means includes a loudspeaker, said first current connector means including still another first current connector fixed with respect to said loudspeaker.

* * * * *